United States Patent
Ikeda

(10) Patent No.: US 11,141,866 B2
(45) Date of Patent: Oct. 12, 2021

(54) GRASPING APPARATUS, GRASPING DETERMINATION METHOD AND GRASPING DETERMINATION PROGRAM

(71) Applicant: TOYOTA JIDOSHA KABUSHIKI KAISHA, Toyota (JP)

(72) Inventor: Takuya Ikeda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 512 days.

(21) Appl. No.: 16/180,387

(22) Filed: Nov. 5, 2018

(65) Prior Publication Data

US 2019/0168397 A1 Jun. 6, 2019

(30) Foreign Application Priority Data

Dec. 5, 2017 (JP) .............................. JP2017-233509

(51) Int. Cl.
*G06F 17/00* (2019.01)
*B25J 15/10* (2006.01)
*B25J 9/16* (2006.01)

(52) U.S. Cl.
CPC ............. *B25J 15/10* (2013.01); *B25J 9/1612* (2013.01); *B25J 9/1664* (2013.01); *B25J 9/1694* (2013.01); *G05B 2219/39469* (2013.01); *G05B 2219/39527* (2013.01); *G05B 2219/39571* (2013.01); *G05B 2219/40583* (2013.01)

(58) Field of Classification Search
CPC ........ B25J 15/10; B25J 9/1612; B25J 9/1664; B25J 9/1694; B25J 13/08; B25J 15/00; G05B 2219/39571; G05B 2219/39469; G05B 2219/40583; G05B 2219/39527

USPC ......................................................... 700/259
See application file for complete search history.

(56) References Cited

U.S. PATENT DOCUMENTS

| | | | |
|---|---|---|---|
| 9,375,839 B2* | 6/2016 | Ota ........................ | B25J 9/1669 |
| 2003/0018414 A1 | 1/2003 | Watanabe et al. | |
| 2010/0139437 A1* | 6/2010 | Ichikawa ............... | B25J 13/082 |
| | | | 74/490.05 |
| 2011/0010009 A1* | 1/2011 | Saito ...................... | B25J 9/1612 |
| | | | 700/253 |

(Continued)

FOREIGN PATENT DOCUMENTS

| | | |
|---|---|---|
| JP | 60-42587 U | 3/1985 |
| JP | 1-264794 A | 10/1989 |

(Continued)

OTHER PUBLICATIONS

Notice of Reasons for Refusal dated Feb. 24, 2021 in Japanese Patent Application No. 2017-233509 (submitting English language translation only), 4 pages.

*Primary Examiner* — Ronnie M Mancho
(74) *Attorney, Agent, or Firm* — Oblon, McClelland, Maier & Neustadt, L.L.P.

(57) ABSTRACT

A grasping apparatus brings a hand unit to a standstill after performing a grasping motion for a target object that deforms when being grasped, performs a determination operation of making an arm unit move and displace the whole hand unit so that a part of the target object that is not grasped by the hand unit may cover a specific spot, and determines that the hand unit has successfully grasped the target object when an observation unit can no longer observe the specific spot after starting the determination operation.

12 Claims, 9 Drawing Sheets

(56) References Cited

U.S. PATENT DOCUMENTS

| | | | |
|---|---|---|---|
| 2013/0006423 A1 | 1/2013 | Ito et al. | |
| 2013/0310980 A1* | 11/2013 | Matsuoka | B25J 15/0023 |
| | | | 700/260 |
| 2018/0215040 A1* | 8/2018 | Asahara | B25J 9/1694 |
| 2018/0215042 A1* | 8/2018 | Nakayama | B25J 9/1694 |
| 2019/0015981 A1* | 1/2019 | Yabushita | B25J 9/1666 |
| 2021/0008717 A1* | 1/2021 | Takahashi | G05D 1/0246 |

FOREIGN PATENT DOCUMENTS

| | | |
|---|---|---|
| JP | 8-323678 | 12/1996 |
| JP | 2002-36159 | 2/2002 |
| JP | 2003-34430 | 2/2003 |
| JP | 2003-53689 A | 2/2003 |
| JP | 2013-10155 | 1/2013 |

\* cited by examiner

GRASPING APPARATUS, GRASPING DETERMINATION METHOD AND GRASPING DETERMINATION PROGRAM

CROSS REFERENCE TO RELATED APPLICATIONS

This application is based upon and claims the benefit of priority from Japanese patent application No. 2017-233509, filed on Dec. 5, 2017, the disclosure of which is incorporated herein in its entirety by reference.

BACKGROUND

The present disclosure relates to a grasping apparatus, a grasping determination method and a grasping determination program.

A technique for determining whether or not a robot hand can grasp a target object is known (for example, see Japanese Unexamined Patent Application Publication No. 2013-10155).

SUMMARY

When an object to be grasped by a robot hand is a rigid body, whether or not the grasping is successfully performed can be determined by monitoring a pressure and a grasping width of a grasping part. However, for example, for a target object that deforms when being grasped such as clothes that hang down or sag due to gravity, it has been difficult to accurately determine whether a robot hand has successfully grasped the object by using the existing determination techniques.

A technique for determining whether a robot hand has successfully grasped a target object that deforms when being grasped will be described with reference to the present disclosure.

A first exemplary aspect is a grasping apparatus including: an arm unit; a hand unit capable of grasping an target object that deforms when being grasped, the hand unit being connected to the arm unit; an observation unit capable of observing a second spot of the hand unit, the observation unit being disposed in a first spot of the hand unit; a grasping control unit configured to make the hand unit perform a grasping motion of grasping the target object; and a determination unit configured to perform a determination operation of making the arm unit move and displace the whole hand unit so that a part of the target object that is not grasped by the hand unit may cover the second spot in a state where the grasping control unit have brought the hand unit to a standstill after making the hand unit perform a grasping motion, and determine that the hand unit has successfully grasped the target object when the observation unit can no longer observe the second spot after starting the determination operation.

By performing a determination operation using a feature that a target object deforms as described above, it is possible to accurately determine success or failure of grasping the target object. In this case, the second spot is preferably set on a surface of the hand unit facing a floor surface direction. When the second spot is set as described above, even in a simple determination operation of lifting up a target object, the target object hangs down and thereby intervenes between the first spot and the second spot. Therefore, the grasping determination can be performed more easily.

Further, the second spot may be reset according to a posture of the hand unit. The hand unit may perform a grasping motion while changing its posture relative to a target object.

Therefore, by changing the second spot according to the posture of the hand unit grasping the target object, the grasping determination can be performed more accurately.

Further, the observation unit may be an image pickup unit for taking an image of the second spot. By using an image output from the image pickup unit, the second spot can be observed without placing an active element on the second spot. In contrast, the observation unit may be a light receiving sensor and a light emitting unit may be provided in the second spot. When the second spot is covered with a target object by the determination operation, the light receiving sensor cannot receive light emitted from the emitting unit. Therefore, the grasping determination can be performed with a simpler apparatus structure.

A determination operation can be configured so as to include at least one of an operation of lifting up the whole hand unit and an operation of rotating the whole hand unit with respect to the arm unit. Even by the simple operation as described above, a grasping determination can be performed accurately.

Further, the determination unit may perform the grasping determination when an operation corresponding to the determination operation is included in a control operation of controlling the hand unit. For example, when a control operation of carrying a grasped object includes an operation corresponding to a predetermined determination operation (e.g., an operation identical to a predetermined determination operation), the determination unit may perform the grasping determination when the control operation is performed without taking the trouble of independently performing the determination operation. By using the control operation as described above, a time required to accomplish tasks performed by the grasping apparatus can be reduced.

Further, in the case where the grasping apparatus includes a recognition unit configured to recognize an object to be grasped by the hand unit, the determination unit may perform the grasping determination when the recognition unit recognizes the object to be grasped as an object that deforms. With such a structure, a grasping determination can be appropriately performed according to target objects.

Further, the determination unit may perform the grasping determination when it has not been able to be determined whether the target object has been successfully grasped by using another determination method. For example, when most of objects to be grasped are rigid bodies, the grasping determination is firstly performed by using a determination method for rigid bodies. By performing a grasping determination in a stepwise manner, the reliability and the speed can be improved.

Further, a second exemplary aspect is a grasping determination method for a grasping apparatus, the grasping apparatus including: an arm unit; a hand unit capable of grasping a target object that deforms when being grasped, the hand unit being connected to the arm unit; and an observation unit capable of observing a second spot of the hand unit, the observation unit being disposed in a first spot of the hand unit, the grasping determination method including: performing, by the hand unit, a grasping motion of grasping the target object; performing a determination operation of making the arm unit move and displace the whole hand unit so that a part of the target object that is not grasped by the hand unit may cover the second spot in a state where the hand unit is brought to a standstill after a grasping motion has been performed; and determining that the hand unit has successfully grasped the target object when the observation unit can no longer observe the second spot after starting the determination operation.

Further, a third exemplary aspect is a grasping determination program executed in a grasping apparatus, the grasping apparatus including: an arm unit; a hand unit capable of grasping a target object that deforms when being grasped, the hand unit being connected to the arm unit; and an observation unit capable of observing a second spot of the hand unit, the observation unit being disposed in a first spot of the hand unit, the grasping determination program causing a computer in the grasping apparatus to: perform a grasping motion of grasping the target object; perform a determination operation of making the arm unit move and displace the whole hand unit so that a part of the target object that is not grasped by the hand unit may cover the second spot in a state where the hand unit is brought to a standstill after a grasping motion has been performed; and determine that the hand unit has successfully grasped the target object when the observation unit can no longer observe the second spot after starting the determination operation.

In the above second and third exemplary aspects, similarly to the first exemplary aspect, it is possible to accurately determine success or failure of grasping a target object.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to embodiments of the disclosure, the present disclosure according to claims is not limited to the following embodiments. Further, all the components described in the following embodiments are not necessarily indispensable for means to solve problems.

Figure 1:
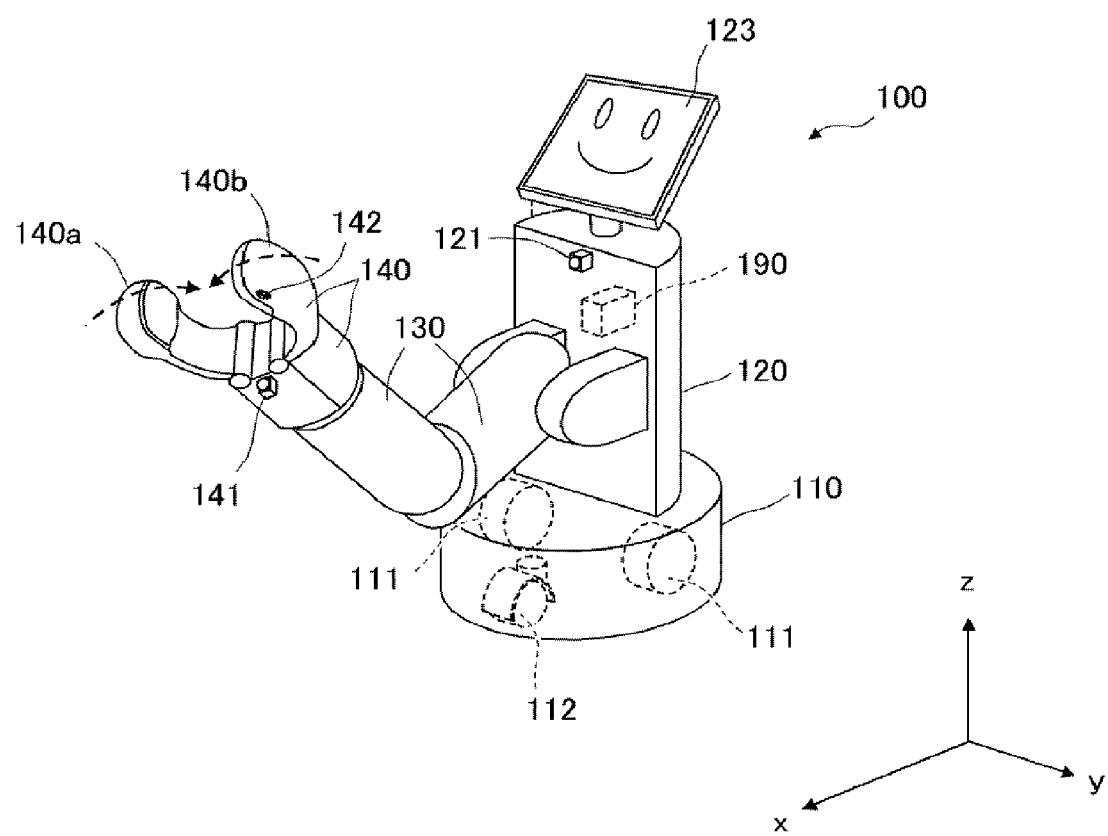
FIG. 1 is an external perspective view of a mobile robot 100 including a grasping apparatus.

FIG. 1 is an external perspective view of a mobile robot 100 including a grasping apparatus according to this embodiment. In FIG. 1, an xy plane is a travel surface of the mobile robot 100 and a z-axis plus direction is a zenith direction. The mobile robot 100 is mainly composed of a carriage unit 110, a main unit 120, an arm unit 130 and a hand unit 140 that constitute a grasping apparatus.

The carriage unit 110 supports two drive wheels 111 and one caster 112, each of which is grounded on a travel surface, in a cylindrical case. The two drive wheels 111 are disposed so that the centers of their rotation axes coincide with each other. Each drive wheel 111 is independently and rotationally driven by using a motor (not shown). The caster 112 is a driven wheel and provided so that a rotating shaft extending in a vertical direction from the carriage unit 110 pivotally supports the wheel apart from the rotation axis of the wheel. Further, the caster 112 follows a moving direction of the carriage unit 110. For example, the mobile robot 100 goes straight when the two drive wheels 111 are rotated at the same speed in the same direction, and rotates around the vertical axis passing through the center of two drive wheels 111 of the carriage unit 110 when the two drive wheels 111 are rotated at the same speed in the reverse direction.

The main unit 120 supports the arm unit 130 and includes a display panel 123 which forms a part of a user interface. The display panel 123 is, for example, a liquid-crystal panel, and displays a face of a character and shows information on the mobile robot 100. The display panel 123 has a touch panel on the display surface and can receive an input instruction from a user.

The main unit 120 includes a first image pickup unit 121 disposed at a position where it can observe moving ranges of the arm unit 130 and the hand unit 140. The first image pickup unit 121 includes an image pickup device which is, for example, a CMOS image sensor and an image data generating unit. Further, the first image pickup unit 121 outputs image data generated by taking an image of an operation space of the arm unit 130 and the hand unit 140. Further, a control unit 190 is provided in the main unit 120. The control unit 190 includes a control unit, a memory and the like, which will be described later.

The arm unit 130 supported by the main unit 120 is an example of arm units and has, for example, two links shown in FIG. 1 and may take various postures by driving motors (not shown) provided at the base ends of the respective links. The hand unit 140 is connected to a distal end of the arm unit 130, and the whole hand unit 140 can be rotated by driving a motor (not shown) around a rotating shaft parallel to an extending direction of a distal-end link of the arm unit 130. The hand unit 140 is an example of hand units and includes a first finger 140a and a second finger 140b which are driven by a motor (not shown) at its distal end. The first and second fingers 140a and 140b can grasp by moving so as to approach each other as indicated by dashed lines arrows and grasping a target object.

A second pickup unit 141 is disposed as a first spot at a predetermined position of the hand unit 140. Further, an index 142 is disposed as a second spot at a predetermined position of the hand unit 140. The first spot is set at a position where the index 142 can be observed by the second image pickup unit to be installed. The second spot is set on a surface facing a floor surface direction (z-axis minus direction in the coordinate system in FIG. 1). In this embodiment, the first spot is set on the lower surface of a support base part of the first and second fingers 140a and 140b, and the second spot is set on the lower surface of the second finger 140b.

The second image pickup unit 141 is an example of observation units, and includes an image pickup device which is, for example, a CMOS image sensor and an image data generating unit. Further, the second image pickup unit 141 outputs image data generated by taking an image of a space in proximity to the index 142. The index 142 is a marker which is, for example, a cross shape or the like so as to be easily recognized in an image. Further, a seal printed with a marker may be attached to the second spot or directly printed on the second spot. The index 142 may be any index whose image can be taken by the second image pickup unit 141 and which can be recognized in the taken image.

Figure 2:
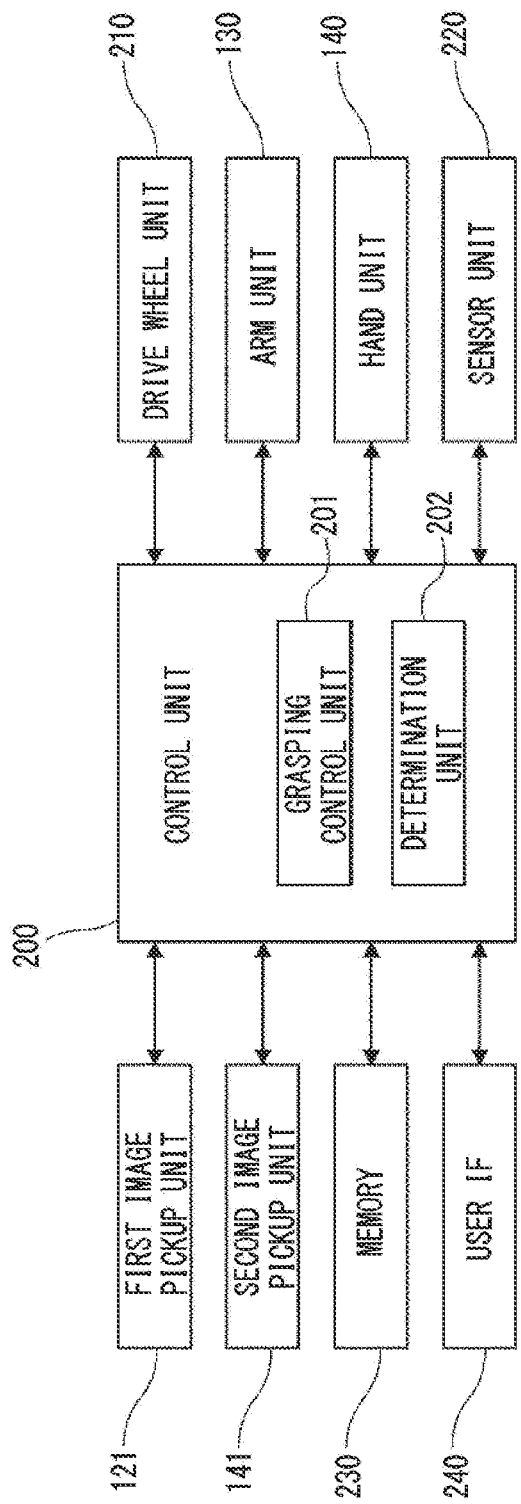
FIG. 2 is a control block diagram of the mobile robot.

FIG. 2 is a control block diagram of the mobile robot 100. A control unit 200, for example, is a CPU, and is housed in the control unit 190 of the main unit 120. The drive wheel unit 210 includes a drive circuit and a motor for driving the drive wheels 111, and is provided in the carriage unit 110. The control unit 200 sends a drive signal to the drive wheel unit 210 to control a rotation of the drive wheels 111.

The arm unit 130 includes a drive circuit for driving a motor, an encoder for observing a moving amount, and the like, in addition to the structure described with reference to FIG. 1. The control unit 200 sends a drive signal to the arm unit 130 to control motions and postures of the arm. The hand unit 140 includes a drive circuit for driving a motor, an encoder for observing a moving amount, and the like, in addition to the structure described with reference to FIG. 1. The control unit 200 sends a drive signal to the hand unit 140 to control motions and postures of the hand.

A sensor unit 220 includes various sensors for detecting obstacles while moving and contact from outside, and is disposed in the carriage unit 110 and the main unit 120 in a distributed manner. The control unit 200 sends a control signal to the sensor unit 220 to drive various sensors and obtains outputs from them.

As described above, the first image pickup unit 121 is used for observing a motion range of the arm unit 130 and the hand unit 140, and takes an image according to an image-taking instruction from the control unit 200. The first image pickup unit 121 transfers the generated image data to the control unit 200. As described above, the second image pickup unit 141 is used for observing a space in proximity to the index 142, and takes an image according to an image-taking instruction from the control unit 200. The second image pickup unit 141 transfers the generated image data to the control unit 200.

A memory 230 is a nonvolatile storage medium, and for example, a solid state drive is used. The memory 230 stores various parameter values, functions, lookup tables and the like which are used for controlling the mobile robot 100 in addition to a robot control program. The robot control program includes a grasping control program for controlling the arm unit 130 and the hand unit 140 that constitute a grasping apparatus. A user IF 240 is a display panel 123 or, for example, a speaker or the like that utters synthesized voices, and is a user interface for providing information to a user and receiving an instruction from the user according to control of the control unit 200.

The control unit 200 serves as a functional calculating unit for performing various calculations related to controls. A grasping control unit 201 controls a grasping motion of grasping a target object. A determination unit 202 determines whether or not the hand unit 140 successfully grasps a target object. Specific calculation of these operations will be described in detail later.

Figure 3:
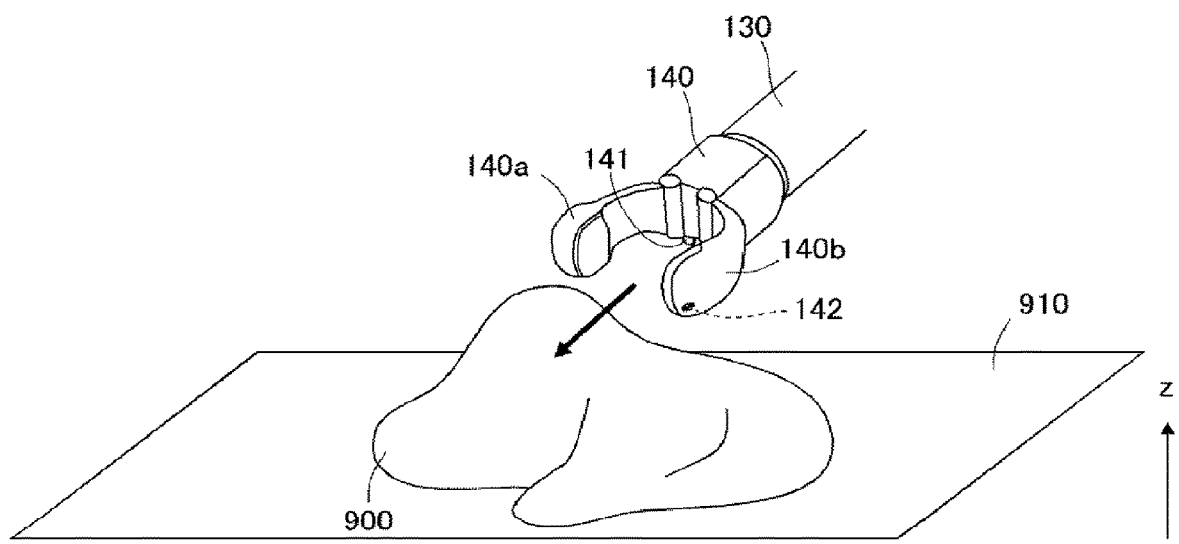
FIG. 3 shows a state in which a hand unit starts a grasping motion.

FIG. 3 shows a state in which a hand unit 140 starts a grasping motion. Note that it is assumed that a target object that the hand unit 140 tries to grasp is a towel 900 placed on a table 910. The towel 900 is an example of target objects that have their whole shapes deformed under the influence of gravity when being grasped. The above described target objects include paper, leather, cables and the like, in addition to cloths.

The hand unit 140 approaches the towel 900 in a posture in which the first and second fingers 140*a* and 140*b* are opened, and the first and second spots in which the second image pickup unit 141 and the index 142 are disposed respectively face a floor surface direction (upper surface direction of the table in this case). Specifically, the grasping control unit 201 uses image data obtained from the first image pickup unit 121 to determine a part of the towel 900 that can be grasped. Then, the grasping control unit 201 adjusts the hand unit 140 into the above state and drives the arm unit 130 forward toward the determined part that can be grasped (direction indicated by a bold arrow in FIG. 3).

Figure 4:
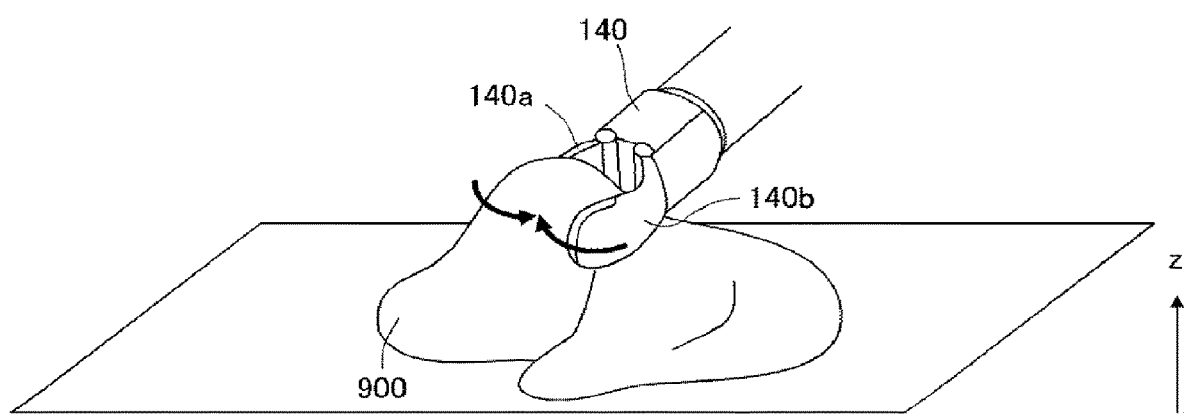
FIG. 4 shows a state in which the hand unit grasps a target object.

Following the state shown in FIG. 3, FIG. 4 shows a state in which the hand unit 140 grasps the towel 900 that is the target object. When the grasping control unit 201 recognizes that a part of the towel 900 which can be grasped is accommodated between the opened first and second fingers 140*a* and 140*b*, it drives each finger in the direction indicated by the bold arrow and makes them grasp the part of the towel 900 which can be grasped.

The motion as described above is a grasping motion for grasping a target object. Because of the characteristic of the target object that its shape deforms, in most cases, the control unit 200 has still not actually recognized whether or not the grasping has been successfully performed at this stage. Thus, in this embodiment, the control unit 200 performs a determination operation for determining whether a target object has been successfully grasped. The determination operation displaces the whole hand unit by making the arm unit 130 move so that a part of the target object that is not grasped by the hand unit 140 may cover the second spot in a state where the hand unit 140 is brought to a standstill after the grasping motion is performed. Several examples of the determination operation will be described below.

Figure 5:
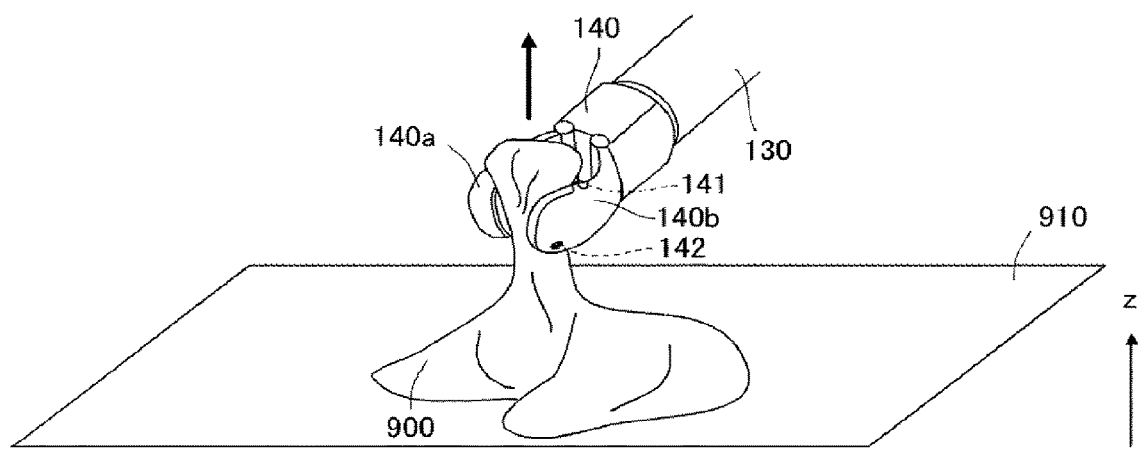
FIG. 5 is a drawing for describing a first determination operation.

FIG. 5 is a drawing for describing a first determination operation. The first determination operation is an operation of lifting up the whole hand unit 140. The determination unit 202 controls the arm unit 130 to move the hand unit 140, which has completed a grasping motion, upward (the z-axis plus direction) as indicated by the bold arrow. When the hand unit 140 has successfully grasped the towel 900, the towel 900 is lifted up from the upper surface of the table 910 and a part of the towel lower than the part grasped by the first and second fingers 140*a* and 140*b* hangs down. Then, the part hanging down is interposed between the second image pickup unit 141 and the index 142, so that the index 142 cannot be observed from the second image pickup unit 141. The determination unit 202 makes use of this phenomenon. That is, the determination unit 202 determines that the hand unit 140 has successfully grasped the towel 900 when the index 142, which has been observable until that time, can no longer be observed as a result of the first determination operation. Specifically, the determination unit 202 sends an image pickup signal to the second image pickup unit 141 after performing the determination operation, analyzes the consequently-obtained image data, and checks that the index 142 is not in the image. Note that the first determination operation is not limited to an operation of lifting a target object exactly upward and may instead be an operation of lifting up a target object diagonally according to circumstances, etc.

Figure 6:
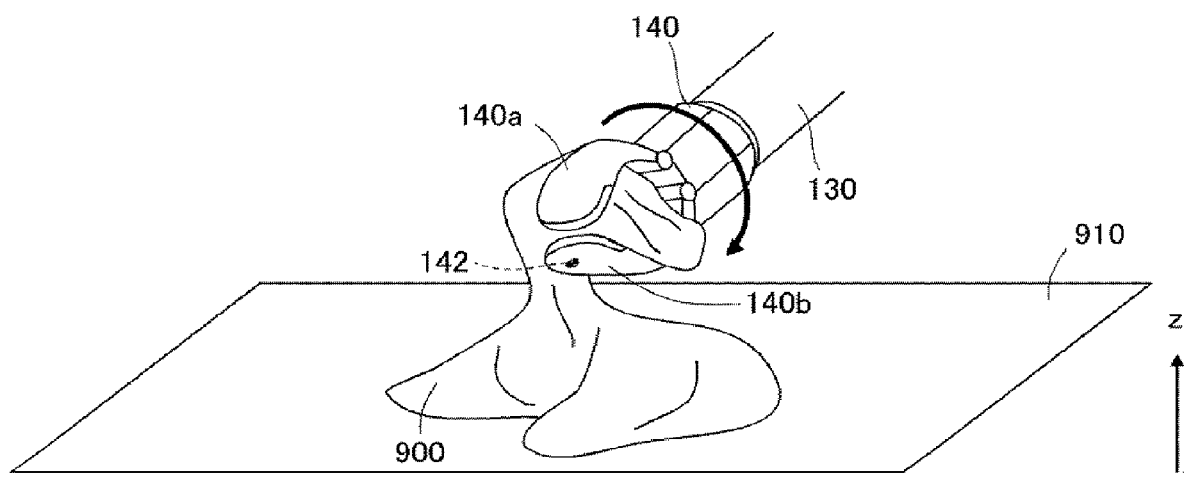
FIG. 6 is a drawing for describing a second determination operation.

FIG. 6 is a drawing for describing a second determination operation. The second determination operation is an operation of rotating the whole hand unit 140 with respect to the arm unit 130. The determination unit 202 control the arm unit 130 to rotate the hand unit 140, which has completed the grasping motion, in the direction indicated by the bold arrow. That is, when the hand unit 140 has successfully grasped the towel 900, the determination unit 202 rotates the hand unit 140 so that a part of the towel 900 that hangs down from or is wound around the hand unit covers the index 142. The determination unit 202 determines that the hand unit 140 has successfully grasped the towel 900 when the index 142, which has been observable until that time, can no longer be observed as a result of the second determination operation. Specifically, the determination unit 202 sends an image pickup signal to the second image pickup unit 141 after performing a determination operation, analyzes the consequently-obtained image data, and checks that the index 142 is not in the obtained image. Note that in the second determination operation, the hand unit 140 is preferably rotated in the direction opposite to the direction indicated by the bold arrow in FIG. 6 when the index 142 is provided on the lower surface of the first finger 140a. Further, according to various situations in which a distance between the table 910 and the hand unit 140 is short, etc., the hand unit 140 may be rotated after being temporarily separated from the table 910.

Figure 7:
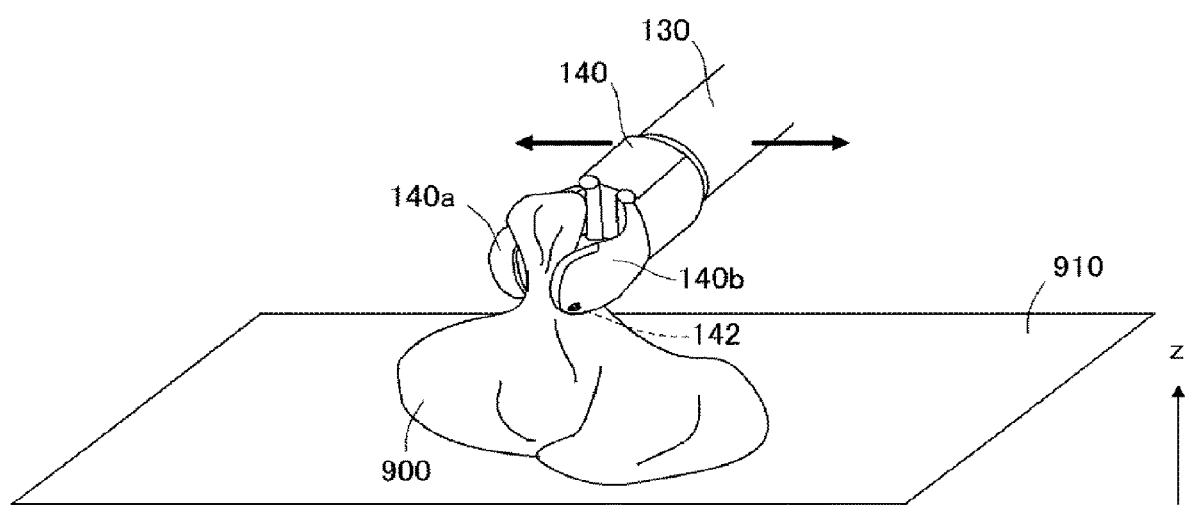
FIG. 7 is a drawing for describing a third determination operation.

FIG. 7 is a drawing for describing a third determination operation. The third determination operation is an operation of swinging the whole hand unit 140 in a direction parallel to the surface of the table 910. The determination unit 202 controls the arm unit 130 to reciprocate the hand unit 140, which has completed a grasping motion, several times in the direction indicated by the bold arrow. When the hand unit 140 has successfully grasped the towel 900, a part of the towel 900 hanging down from the hand unit swings so that it is intermittently interposed between the second image pickup unit 141 and the index 142. The determination unit 202 determines that the hand unit 140 has successfully grasped the towel 900 when the index 142, which has been observable until that time, can no longer be observed intermittently or continuously after starting the third determination operation. Specifically, the determination unit 202 sends an image pickup signal to the second image pickup unit 141 after starting the determination operation, analyzes the image data obtained as a result, and checks that the index 142 is not in the image intermittently or continuously.

Three determination operations were described above. However, when the index 142 is in the image data obtained by the determination operation, the determination unit 202 may determine that a grasping is not successfully performed or a situation of grasping is unknown. When the determination unit 202 determines that a grasping is not successfully performed, the control unit 200 performs the grasping operation again. When the determination unit 202 determines that a situation of grasping is unknown, it may perform the determination again by performing another determination operation, or perform the determination using other more rigorous determination methods. Further, the determination operation is not limited to the above three operations and may be any operation of displacing the whole hand unit by making the arm unit 130 move so that a part of the target object that is not grasped by the hand unit 140 may cover the second spot in a state where the hand unit 140 is brought to a standstill after the grasping motion is performed.

Note that in the above explanation, "lower surface" means a surface that may face the floor surface direction when the hand unit 140 performs a grasping motion, and does not means a surface that faces the floor surface direction at all times. As described above, since the hand unit 140 can rotate with respect to the distal-end link of the arm unit 130, the first and second spots may face directions other than the floor surface direction during the grasping motion or during the transfer of an object. Further, "surface facing the floor surface direction" does not mean that such a surface is limited to a surface exactly opposed to the floor surface, and may instead be any surface whose normal has a component in a gravity direction. In any case, when a part of an object to be grasped hangs down due to gravity, the object may be interposed between the first spot and the second spot.

Figure 8:
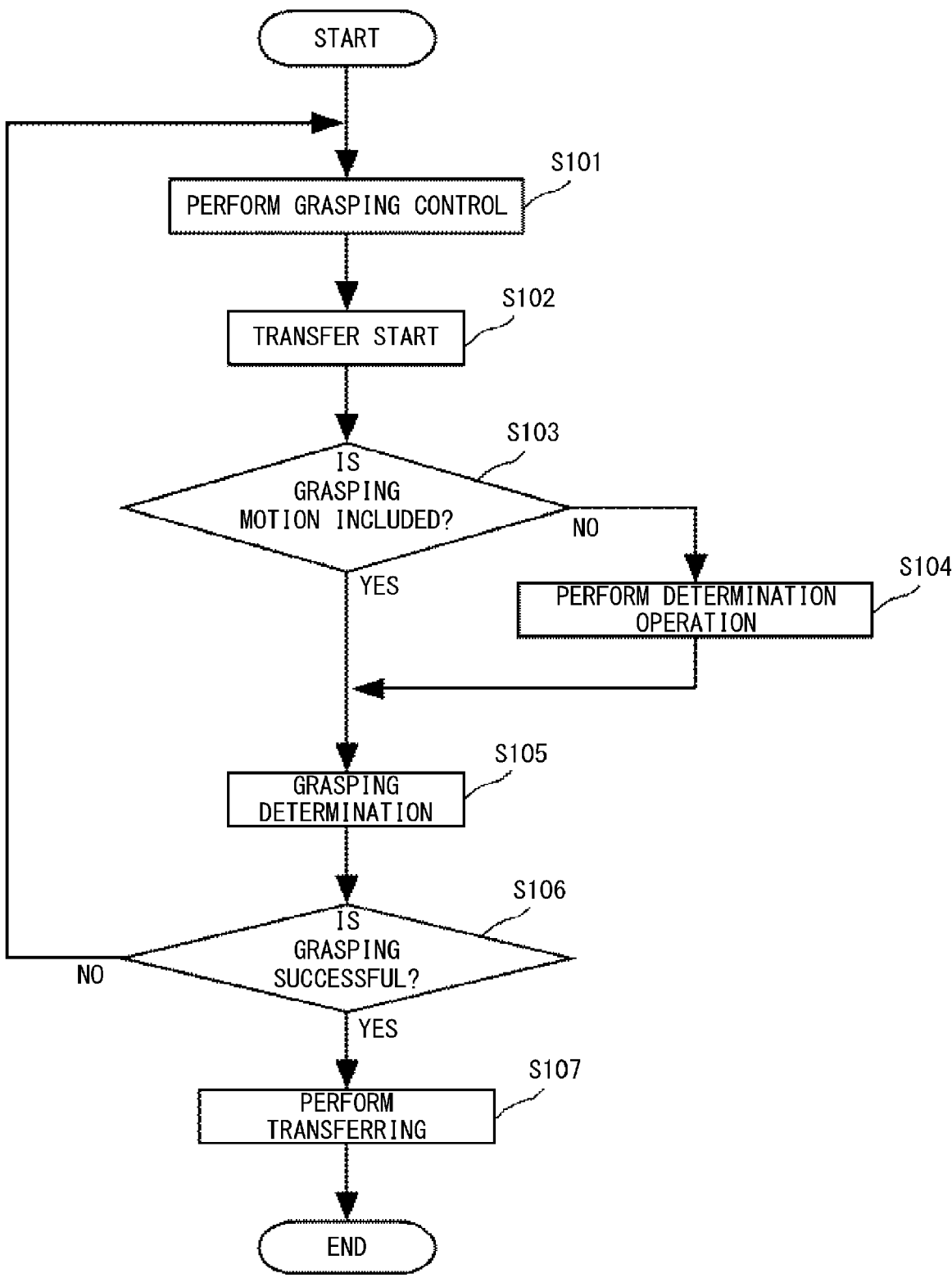
FIG. 8 is a flowchart for describing a first transfer processing.

Next, a transfer processing of an object transferred by the mobile robot 100 will be described. FIG. 8 is a flowchart for describing a first transfer processing. The flow shown in FIG. 8 corresponds to a part of the transfer task including a grasping motion and starts from the point when the mobile robot 100 reaches the vicinity of an object to be transferred. The object to be transferred is an object that has its whole shape deformed under the influence of gravity when being grasped.

The grasping control unit 201 performs a grasping motion with respect to an object to be transferred in a step S101. Specifically, it performs a motion similar to the motion described with reference to FIGS. 3 and 4. When the grasping control unit 201 has completed the grasping motion, the processing proceeds to a step S102 and the control unit 200 starts a transfer operation defined in the transfer task.

The control unit 200 starts a transfer operation and determines whether or not an operation which corresponds to a determination operation is included in the transfer operation within a predetermined time period (step S103). For example, an operation of lifting up an object to be transferred is often included in general transfer operations. In this case, the determination unit 202 determines that the transfer operation includes an operation which corresponds to the above-described first determination operation and uses this operation of lifting up the object to be transferred as a determination operation. That is, when the determination unit 202 determines that an operation identical to a determination operation is included in the transfer operation that will be performed within a predetermined time period, the determination unit 202 attempts to reduce a time required to complete the transfer task by using that operation as the determination operation and thereby skipping the execution of a dedicated determination operation. On the other hand, when the determination unit 202 determines that an operation which corresponds to a determination operation is not included in the transfer operation within a predetermined time period, it performs a dedicated determination operation (step S104).

The determination unit 202 proceeds to a step S105 and performs a grasping determination. Specifically, as described above, the determination unit 202 checks whether or not the index 142, which has been observable until that time, can no longer be observed. Then, the determination unit 202 proceeds to a step S106, determines that the object to be transferred has been successfully grasped when the index 142 can no longer be observed, and proceeds to a step S107. Otherwise, the determination unit 202 returns to the step S101 and performs a grasping control again. In this case, the determination unit 202 may forcibly proceed from the step S103 to the step S104 and controlled so as to perform a determination operation different from the previous determination operation. Note that when the determination unit 202 has returned a predetermined number of times to the step S101 and performed a grasping control, a series of processes described above may be stopped. When the control unit 200 proceeds to the step S107, it performs the remaining transfer tasks to complete the series of processes.

Figure 9:
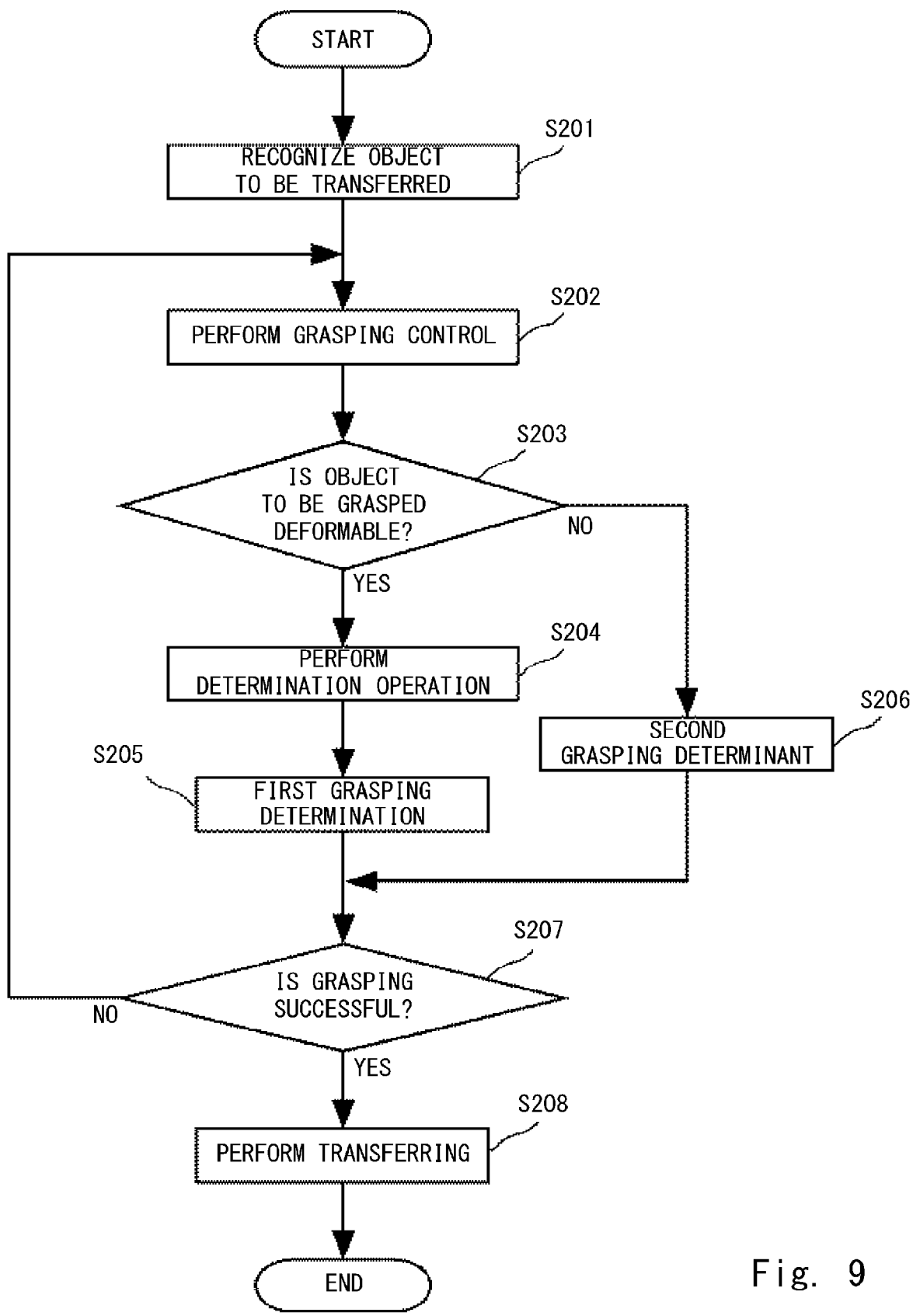
FIG. 9 is a flowchart for describing a second transfer processing.

FIG. 9 is a flowchart for describing a second transfer processing different from the first transfer processing. The flow shown in FIG. 9 corresponds to a part of the transfer task including a grasping motion and starts from the point when the mobile robot 100 reaches the vicinity of an object to be transferred.

The control unit 200 recognizes an object to be transferred in a step S201. Specifically, it obtains image data of the first image pickup unit 121 to identify the object to be transferred by using image recognition techniques. When the control unit 200 has completed the recognition, it proceeds to a step S202 and performs a grasping motion for the object to be transferred. Specifically, it performs a motion similar to the motion described with reference to FIGS. 3 and 4. When the control unit 200 has completed the grasping motion, it proceeds to a step S203 and determines whether or not the object to be transferred is an object that has its whole shape deformed under influence of gravity when it is grasped as a result of the recognition performed in the step S201. When the control unit 200 determines that the object is an object that is deformed when it is grasped, it proceeds to a step S204. Meanwhile, when the control unit 200 determines that the object is not an object that deforms when it is grasped, it proceeds to a step S206.

When the processing proceeds to the step S204, the determination unit 202 performs a determination operation. Then, the determination unit 202 proceeds to a step S205 and, as a first grasping determination, it checks whether or not the index 142, which has been observable until that time, can no longer be observed. When the index 142 can no longer be observed, the determination unit 202 determines that the grasping has been successfully performed.

When the processing proceeds to the step S206, the determination unit 202 performs a second grasping determination. The second grasping determination is a grasping determination for a rigid body. Many techniques for grasping determinations for a rigid body are known. For example, the determination unit 202 determines that the grasping has been successfully performed when a pressure sensor provided in the first finger 140a indicates a value equal to or larger than a predetermined value and the first and second fingers 140a and 140b are separated from each other.

When the processing proceeds from the step S205 or the step S206 to a step S207, the control unit 200 proceeds to a step S208 in the case where the determination unit 202 determines that the grasping of the object to be transferred has been successfully performed. Otherwise, the control unit 200 returns to the step S202 and performs a grasping control again. At this time, when the control unit 200 proceeds to the step S204, it may be controlled so as to perform a determination operation different from the previous determination operation. Note that when the control unit 200 has returned a predetermined number of times to the step S202 and performed a grasping control, a series of processes described above may be stopped. When the control unit 200 proceeds to the step S208, it performs the remaining transfer tasks to complete the series of processes.

Note that the transfer processing is not limited to the two processes described above and can be configured in various other ways. For example, when a determination method for grasping a rigid body, without an object to be transferred being recognized in advance, is used on the assumption that an object to be transferred is a rigid body and then it cannot be determined that the object has been grasped by using this method, the above-described determination method in which a grasping determination is performed by performing a determination operation may be used.

In the above-described embodiment, the fact that a part of the target object that is not grasped by the hand unit 140 "covers" the second spot is not limited to the case where the part of the target object is physically in contact with the second spot, and includes a state in which the second spot can no longer be observed from the first spot since it is covered by the part of the target object, which is interposed in a space between the first and second spots. Further, in the above-described embodiment, the index 142 is provided as a marker. However, the second image pickup unit 141 as an observation unit may use the shape itself of the second spot in the hand unit 140 as an object to be recognized instead of using the index. That is, a contour, which is observed when the second spot is not covered with a part of a target object, is used as an object to be recognized, and it is determined that the second spot can no longer be observed when this contour can no longer be extracted from image data. By defining the object to be recognized as described above, it is possible to save time and trouble to provide a dedicated index 142.

Figure 10:
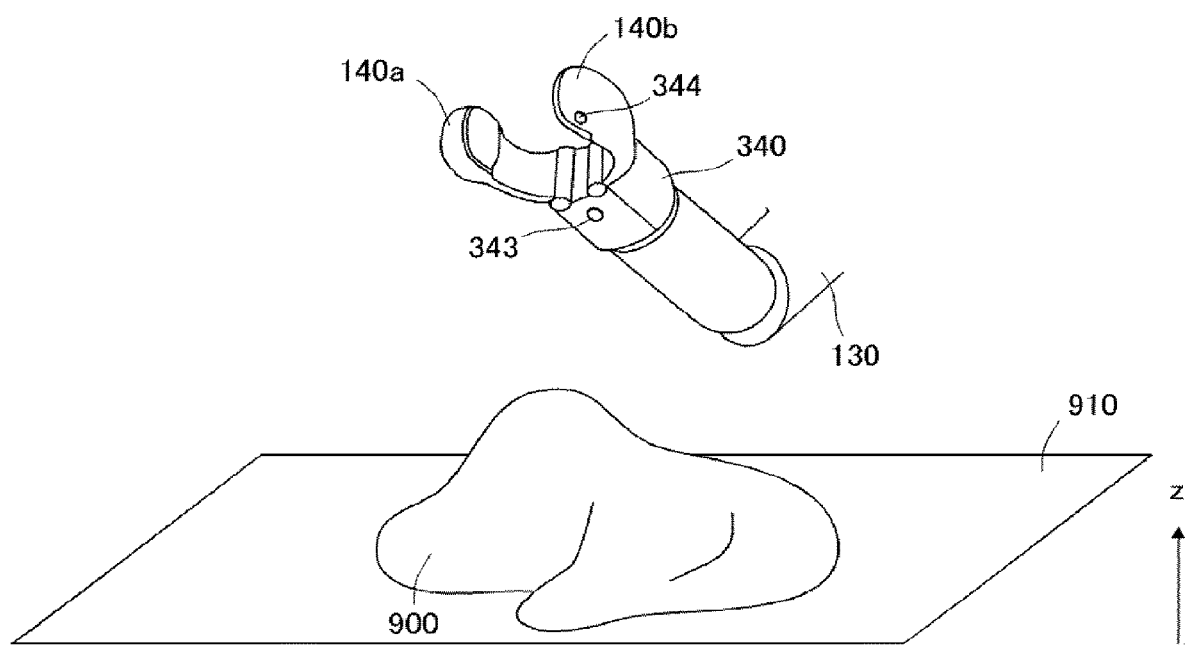
FIG. 10 is an external perspective view showing another example of the hand unit.

Next, a modified example of a hand unit will be described. FIG. 10 is an external perspective view showing another example of a hand unit 340. The hand unit 340 includes a first finger 140a and a second finger 140b similarly to the above-described hand unit 140. However, unlike the hand unit 140, in the hand unit 340, a light receiving sensor 343, instead of a second image pickup unit 141, is disposed in the first spot, and a LED 344 that emits infrared light, instead of an index 142, is disposed in the second spot. Note that, like in FIG. 3, etc., in FIG. 10, a table 910 and a towel 900 are shown to facilitate the understanding of a relative positional relation of them with the object to be grasped.

The light receiving sensor 343 is an example of observation units, and the LED 344 is an example of light emitting units. The light receiving sensor 343 observes a situation of the second spot by receiving light emitted from the LED 344. Both the light receiving sensor 343 and the LED 344 are adjusted so that the light receiving sensor 343 cannot receive the light emitted from the LED 344 when the LED 344 disposed in the second spot is covered with a target object.

As described above, by providing the light receiving unit and the light emitting unit in the first and the second spots, respectively, it can be determined whether the grasping of the target object has been successfully performed through the determination operation. The above structure in which the light receiving unit and the light emitting unit are provided is simpler than a structure using an image pickup unit, and thus a cost for a grasping apparatus can be reduced.

Figure 11:
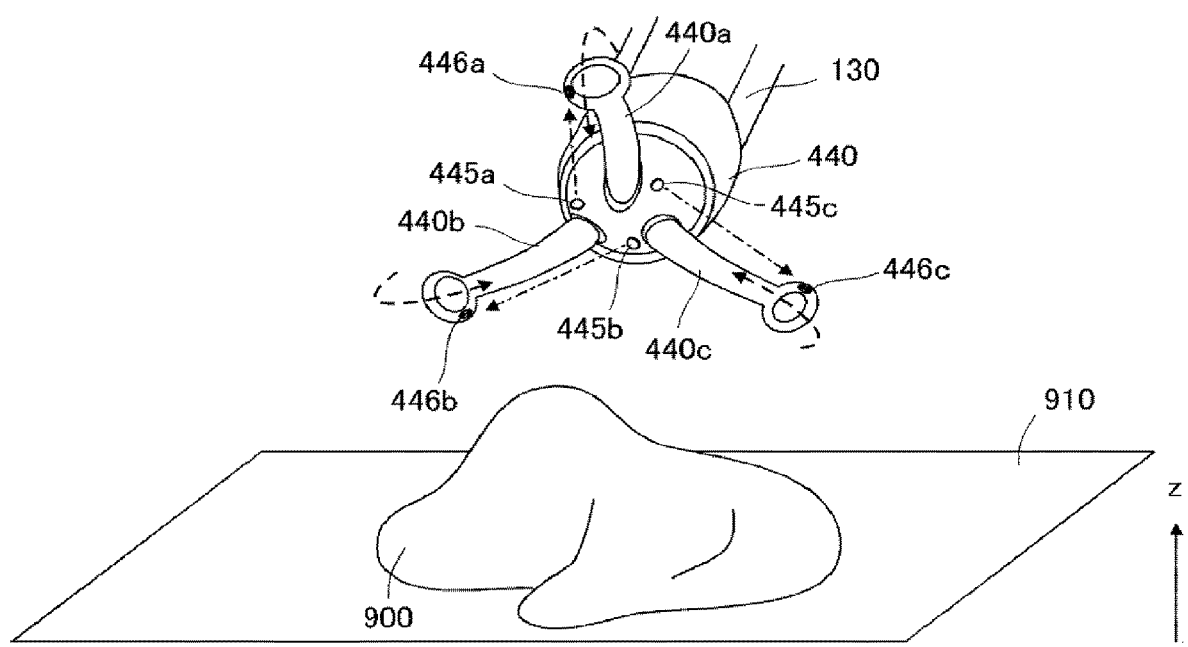
FIG. 11 is an external perspective view showing another example of the hand unit.

FIG. 11 is an external perspective view showing another example of a hand unit 440. The hand unit 440 is a claw-type hand unit that grasps a target object with three claws. Specifically, as shown in FIG. 11, the hand unit 440 includes a first claw 440a, a second claw 440b, and a third claw 440c, and they can grasp a target object by moving their respective distal ends so as to approach one another as indicated by dashed line arrows and thereby holding the target object therein. Similar to the hand unit 140, the hand unit 440 can be rotated by driving a motor (not shown) around a rotating shaft parallel to an extending direction of a distal-end link of an arm unit 130. The hand unit 440 is rotated so as to easily stick out the claws according to postures or the like of the object to be grasped. Note that, similar to FIG. 3, etc., in FIG. 11, a table 910 and a towel 900 are shown so as a relative positional relation of them with an object to be grasped can be understood.

A first light receiving sensor 445a, a second light receiving sensor 445b, and a third light receiving sensor 445c are provided in a base body of the hand unit 440 which supports the three claws in a movable manner. The first light receiving sensor 445a is provided near the base end of the first claw 440a, the second light receiving sensor 445b is provided near the base end of the second claw 440b, and the third light receiving sensor 445c is provided near the base end of the third claw 440c. Further, a first LED 446a is provided at the distal end of the first claw 440a, a second LED 446b is provided at the distal end of the second claw 440b, and a third LED 446c is provided at the distal end of the third claw 440c. The first light receiving sensor 445a is adjusted so as to receive light emitted from the first LED 446a and not to receive light emitted from another LED. The second light receiving sensor 445b is adjusted so as to receive light emitted from the second LED 446b and not to receive light emitted from another LED. The third light receiving sensor 445c is adjusted so as to receive light emitted from the third LED 446c and not to receive light emitted from another LED.

The determination unit 202 determines which LED can be covered with a part of the object to be grasped when performing a determination operation, and resets a spot in which that LED is disposed as a second spot. That is, since the hand unit 440 can be rotated in the grasping operation, the determination unit 202 determines which LED is facing a lower surface direction in the determination operation. Then, the determination unit 202 determines whether the grasping has been successfully performed by checking whether the light receiving sensor adjusted so as to receive the light emitted from that LED can receive the emitted light after the determination operation has started.

As described above, a plurality of combinations of a light emitting unit and a light receiving unit may be provided in a hand unit, and it may be determined in advance which combination of the light emitting unit and the light receiving unit is used for a grasping determination according to postures of the hand unit. Note that instead of the combination of the light emitting unit and the light receiving unit, a combination of an image pickup unit and an index may be provided as the hand unit 140. With such a structure, the above-described determination method can be applied to various types of hand units.

In this embodiment described above, the first and second spots are in a relative positional relation and their respective positions therefore may be exchanged with each other. For example, the respective positions of the index 142 and the second pickup image unit 141 may be exchanged with each other. Further, which index is observed may also be changed according to a determination operation to be performed by disposing a plurality of indexes.

Further, in this embodiment described above, the example in which a mobile robot 100 for transferring an object to be transferred includes a grasping apparatus has been described. However, the grasping apparatus may be an independent apparatus that does not include a moving mechanism or the like. In this case, a control unit necessary for controlling a grasping apparatus is provided in the grasping apparatus.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A grasping apparatus comprising:
   an arm unit;
   a hand unit capable of grasping a target object that deforms when being grasped, the hand unit being connected to the arm unit;
   an observation unit capable of observing a second spot of the hand unit, the observation unit being disposed in a first spot of the hand unit;
   a grasping control unit configured to make the hand unit perform a grasping motion of grasping the target object; and
   a determination unit configured to perform a determination operation of making the arm unit move and displace the whole hand unit so that a part of the target object that is not grasped by the hand unit may cover the second spot in a state where the grasping control unit has brought the hand unit to a standstill after making the hand unit perform a grasping motion, and determine that the hand unit has successfully grasped the target object when the observation unit can no longer observe the second spot after starting the determination operation.

2. The grasping apparatus according to claim 1, wherein the second spot is set on a surface of the hand unit facing a floor surface direction.

3. The grasping apparatus according to claim 2, wherein the second spot is reset according to a posture of the hand unit.

4. The grasping apparatus according to claim 1, wherein the observation unit is an image pickup unit for taking an image of the second spot.

5. The grasping apparatus according to claim 1, wherein the observation unit is a light receiving sensor and a light emitting unit is provided in the second spot.

6. The grasping apparatus according to claim 1, wherein the determination operation includes an operation of lifting up the whole hand unit.

7. The grasping apparatus according to claim 1, wherein the determination operation includes an operation of rotating the whole hand unit with respect to the arm unit.

8. The grasping apparatus according to claim 1, wherein the determination unit performs a grasping determination when an operation corresponding to the determination operation is included in a control operation of controlling the hand unit.

9. The grasping apparatus according to claim 1, comprising a recognition unit configured to recognize a target object to be grasped by the hand unit, wherein
the determination unit performs a grasping determination when the recognition unit recognizes the target object to be grasped as a target object that deforms.

10. The grasping apparatus according to claim 1, wherein the determination unit performs a grasping determination when it has not been able to be determined whether the target object has been successfully grasped by using another determination method.

11. A grasping determination method for a grasping apparatus, the grasping apparatus comprising:
an arm unit;
a hand unit capable of grasping a target object that deforms when being grasped, the hand unit being connected to the arm unit; and
an observation unit capable of observing a second spot of the hand unit, the observation unit being disposed in a first spot of the hand unit,
the grasping determination method comprising:
performing, by the hand unit, a grasping motion of grasping the target object;
performing a determination operation of making the arm unit move and displace the whole hand unit so that a part of the target object that is not grasped by the hand unit may cover the second spot in a state where the hand unit is brought to a standstill after a grasping motion has been performed; and
determining that the hand unit has successfully grasped the target object when the observation unit can no longer observe the second spot after starting the determination operation.

12. A non-transitory computer readable medium storing a grasping determination program executed in a grasping apparatus, the grasping apparatus comprising:
an arm unit;
a hand unit capable of grasping a target object that deforms when being grasped, the hand unit being connected to the arm unit; and
an observation unit capable of observing a second spot of the hand unit, the observation unit being disposed in a first spot of the hand unit,
the grasping determination program causing a computer in the grasping apparatus to:
perform a grasping motion of grasping the target object;
perform a determination operation of making the arm unit move and displace the whole hand unit so that a part of the target object that is not grasped by the hand unit may cover the second spot in a state where the hand unit is brought to a standstill after a grasping motion has been performed; and
determine that the hand unit has successfully grasped the target object when the observation unit can no longer observe the second spot after starting the determination operation.

* * * * *